United States Patent [19]
Digman

[11] Patent Number: 5,967,539
[45] Date of Patent: Oct. 19, 1999

[54] TRAIL SAFE SYSTEM

[76] Inventor: Dan Digman, 4206 E. 13th St., Amarillo, Tex. 79104

[21] Appl. No.: 08/863,142

[22] Filed: May 27, 1997

[51] Int. Cl.⁶ .................................................. B60D 63/08
[52] U.S. Cl. ...................................... 280/480.1; 280/480
[58] Field of Search ................................ 280/480, 480.1, 280/457, 432, 460.1, 422; 340/431

[56] References Cited

U.S. PATENT DOCUMENTS

| | | | |
|---|---|---|---|
| 3,395,933 | 8/1968 | Childs | 280/457 |
| 3,724,875 | 4/1973 | Hillman | 280/457 |
| 3,881,751 | 5/1975 | Colby | 280/480 |
| 4,127,855 | 11/1978 | Toner | 280/432 |
| 4,406,476 | 9/1983 | Brandschain . | |
| 5,039,272 | 8/1991 | Holmes et al. . | |
| 5,072,962 | 12/1991 | Webb . | |
| 5,215,325 | 6/1993 | Novotny et al. | 280/480.1 |
| 5,350,186 | 9/1994 | Hull et al. | 280/480.1 |
| 5,362,084 | 11/1994 | Edwards . | |
| 5,476,280 | 12/1995 | MacMullan | 280/480.1 |
| 5,625,335 | 4/1997 | Kelly | 280/432 |

*Primary Examiner*—Lanna Mai
*Assistant Examiner*—Michael Cuff
*Attorney, Agent, or Firm*—Michael I. Kroll

[57] ABSTRACT

A trail safe system (14) extending between a tow truck (16) and a disabled motor vehicle (18) comprising a pair of safety spool assemblies (20). Each safety spool assembly (20) is spaced apart and mounted behind a tail board (22) of the tow truck (16). A pair of cables (24) are provided, in which each cable (24) extends from one safety spool assembly (20) and out through a slot (26) in the tail board (22) of the tow truck (16). A facility (28) is for spring loading and self-rewinding each safety spool assembly (20), so that the cable (24) can be automatically retracted as needed. A structure (30) is for attaching a distal free end of each cable (24) to the disabled motor vehicle (18), so as to keep the disabled motor vehicle (18) being towed connected to and behind the tow truck (16) in case of accidental separation during a towing operation.

8 Claims, 7 Drawing Sheets

TRAIL SAFE SYSTEM

BACKGROUND OF THE INVENTION

1. Field of the Invention

The instant invention relates generally to towing safety restraint devices and more specifically it relates to a trail safe system. The trail safe system utilizes two safety spools with cables to operate without slack between a tow truck and a disabled motor vehicle.

2. Description of the Prior Art

Numerous towing safety restraint devices have been provided in prior art that are adapted to use safety chains by tow trucks when towing motor vehicles, so as to comply with state and federal laws. While these units may be suitable for the particular purpose to which they address, they would not be as suitable for the purposes of the present invention as heretofore described.

SUMMARY OF THE INVENTION

A primary object of the present invention is to provide a trail safe system that will overcome the shortcomings of the prior art devices.

Another object is to provide a trail safe system featuring two permanently mounted, spring-loaded, self-rewinding safety spools with cables which eliminate slack in the cables between a tow truck and a disabled motor vehicle.

An additional object is to provide a trail safe system having locking mechanisms which lock the spools under a surge of a sudden load and will sound an in-cab alarm in an event of failure of the primary hook-up, so as to keep the disabled motor vehicle behind the tow truck in case of separation.

A further object is to provide a trail safe system that is simple and easy to use.

A still further object is to provide a trail safe system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DESCRIPTION OF THE PREFERRED EMBODIMENTS

Turning now descriptively to the drawings, in which similar reference characters denote similar elements throughout the several views, FIGS. 1 to 10 illustrate a trail safe system 14. With regard to the reference numerals used, the following numbering is used throughout the various drawing figures.

14 trail safe system
16 tow truck
18 disabled motor vehicle
20 safety spool assembly of 14
22 tail board of 16
24 cable of 14 in 20
26 slot in 22
28 spring loading and self-rewinding facility of 14 in 20
30 attaching structure of 14 on 24
32 box shaped housing of 20
34 front aperture in 50 of 32
36 shaft of 20
38 spool of 20
40 first flange end of 38
42 second flange end of 38
44 barrel of 38 on 36
46 side panel of 32
48 rear panel of 32
50 front panel of 32
52 top panel of 32
54 bottom panel of 32
56 spiral spring for 28
58 outer end of 56
60 inner end of 56
62 loop for 30
64 lock mechanism of 14
66 support partition of 64 in 32
68 opening in 66

70 notch in 42
72 hole in 48
74 T-shaped locking bar of 64
76 first leg of 74
78 second leg of 74
80 first transverse arm of 74
82 second transverse arm of 74
84 compression spring of 64
86 spring biased release lever of 64
88 torsion spring weight lever
90 horizontal slot in 46
92 L-shaped reset rod
94 short leg of 92
96 long leg of 92
98 alarm switch of 14
100 alarm in 16
102 pickup truck
104 hitch on 106
106 rear bumper of 102
108 trailer
110 tongue on 108
112 coupler on 110
114 forward end of 108
116 protector bushing in 110
118 mini J-hook for 30
120 aperture in 106

Figure 1:
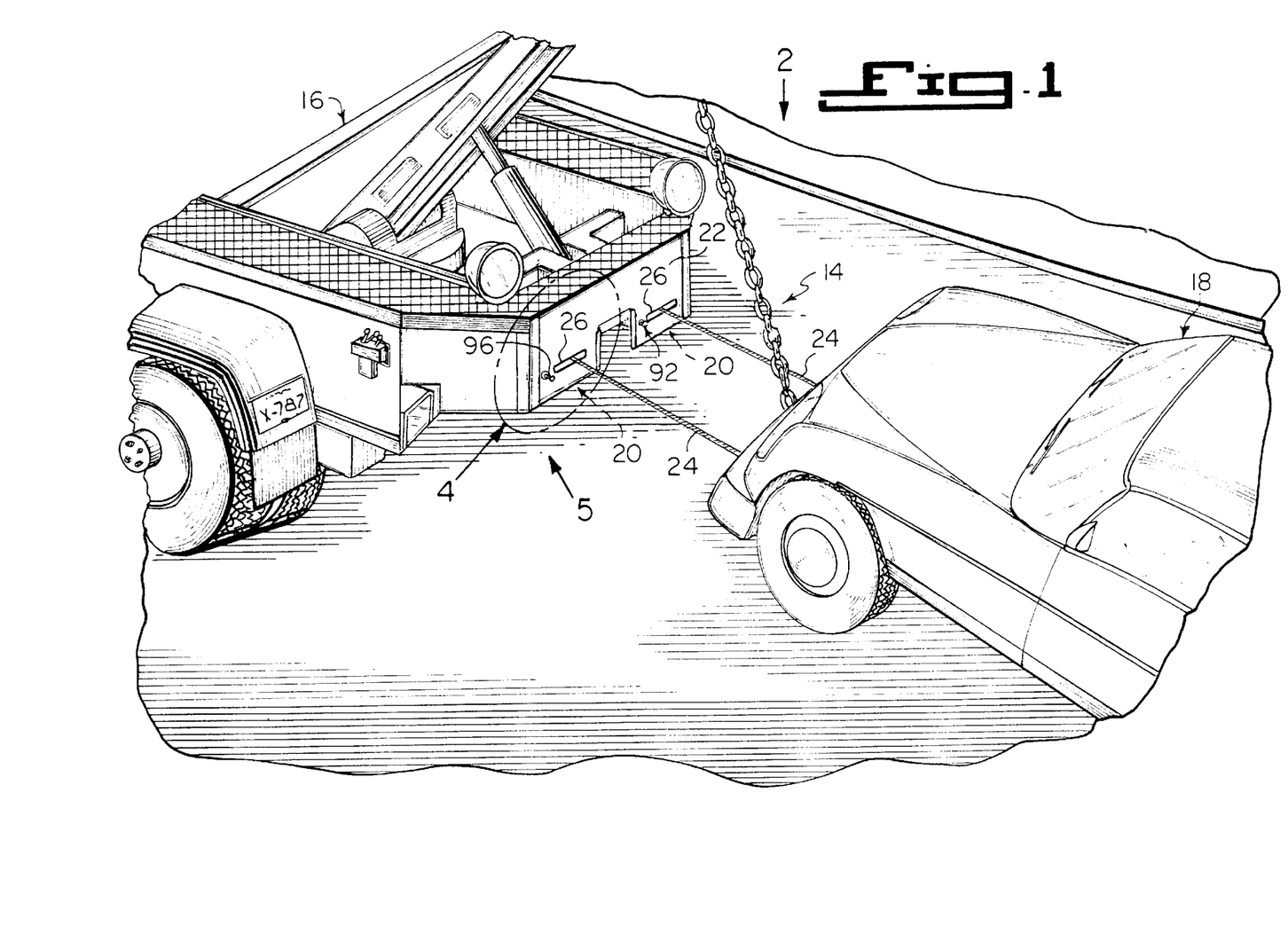
FIG. 1 is a perspective view with parts broken away, showing a tow truck utilizing the instant invention in towing a disabled motor vehicle.

The trail safe system 14 extending between a tow truck 16 and a disabled motor vehicle 18 comprises a pair of safety spool assemblies 20. Each safety spool assembly 20 is spaced apart and mounted behind a tail board 22 of the tow truck 16. A pair of cables 24 are provided, in which each cable 24 extends from one safety spool assembly 20 and out through a slot 26 in the tail board 22 of the tow truck 16. A facility 28 is for spring loading and self-rewinding each safety spool assembly 20, so that the cable 24 can be automatically retracted as needed. A structure 30 is for attaching a distal free end of each cable 24 to the disabled motor vehicle 18, so as to keep the disabled motor vehicle 18 being towed connected to and behind the tow truck 16 in case of accidental separation during a towing operation.

Figures 2, 3, 4:
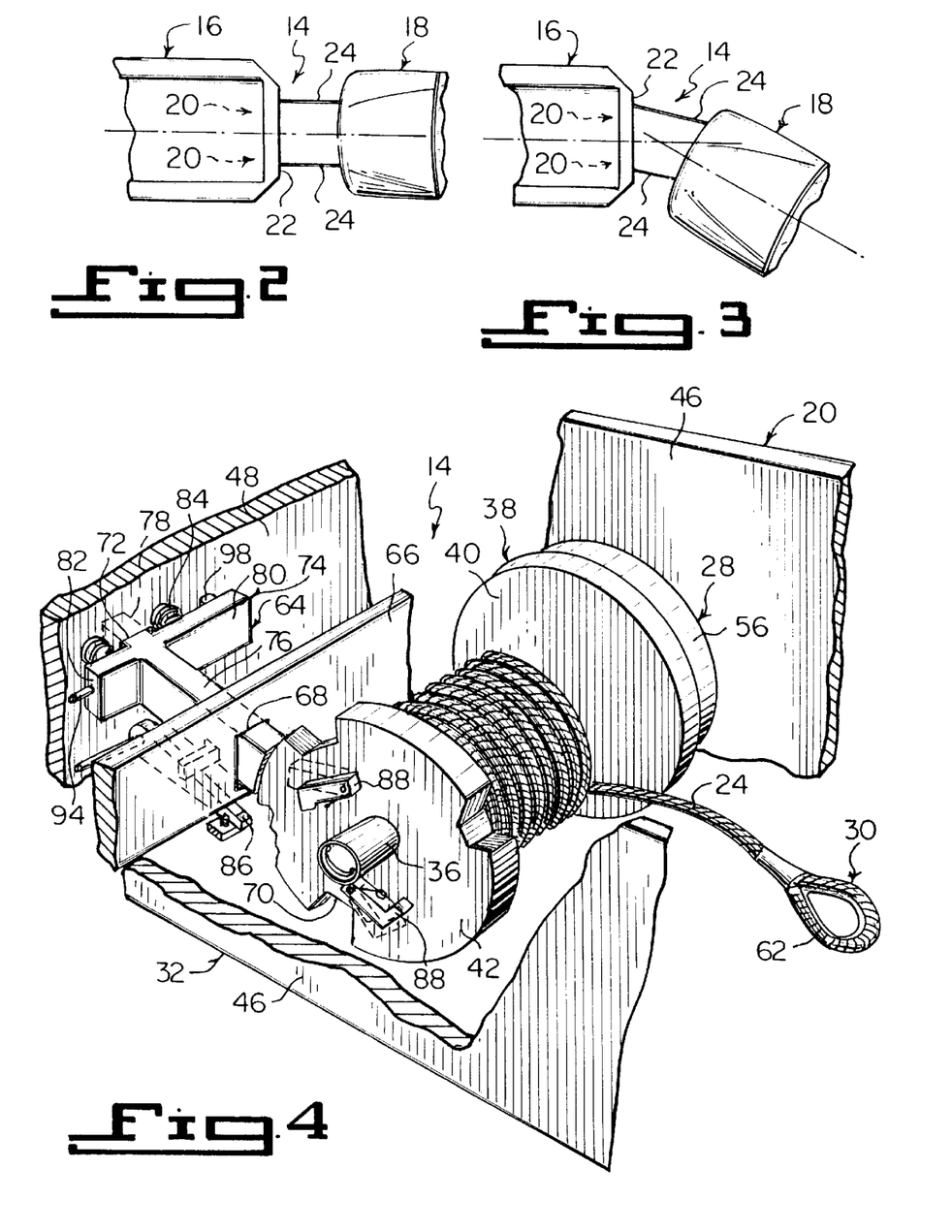
FIG. 2 is a diagrammatic top view taken in the direction of arrow 2 in FIG. 1.
FIG. 3 is a diagrammatic top view similar to FIG. 2, showing the disabled motor vehicle turning in tow.
FIG. 4 is an enlarged perspective view of one safety spool assembly as indicated by arrow 4 in FIG. 1, with parts broken away and in section.
Figures 5, 6:
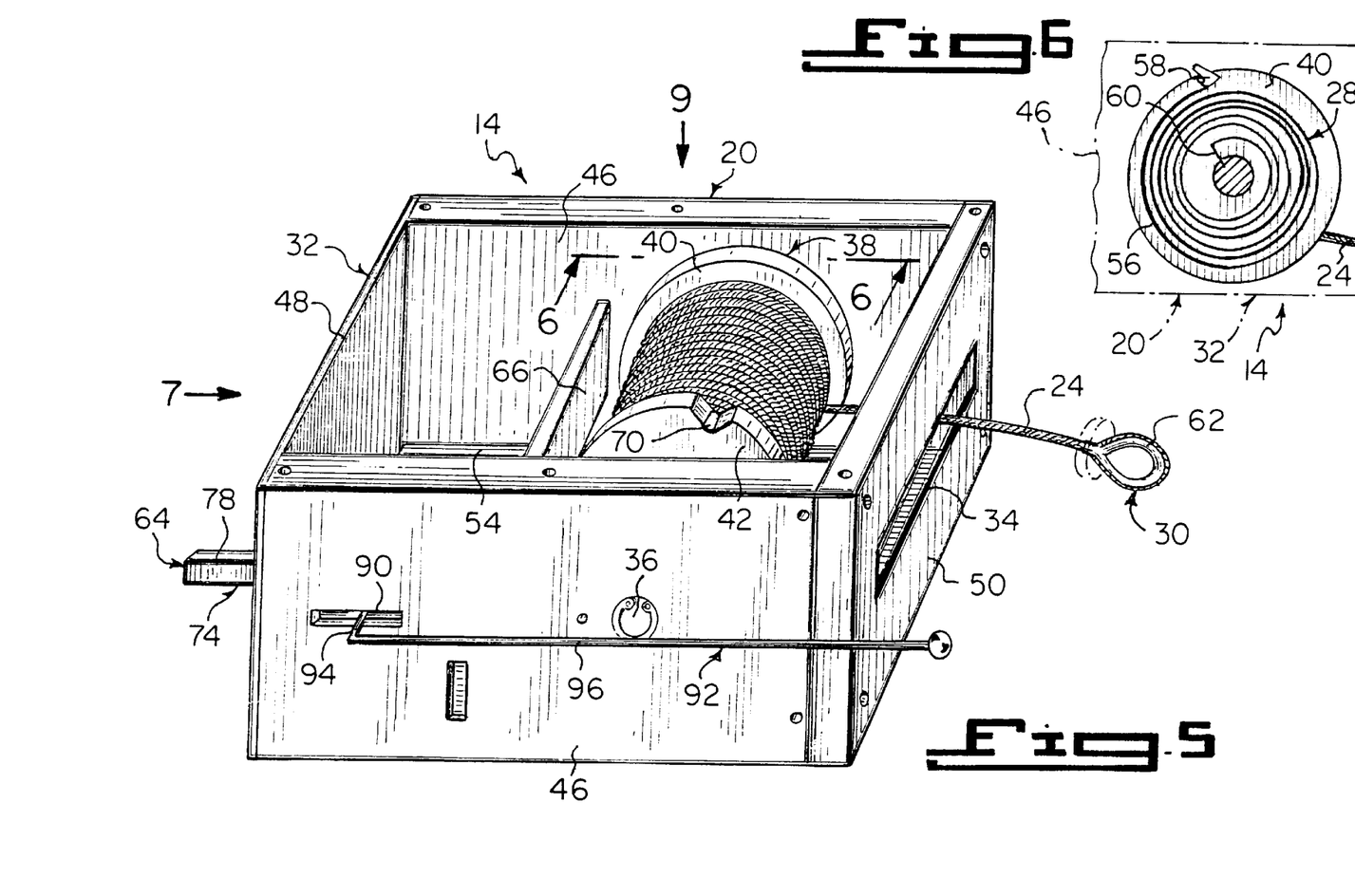
FIG. 5 is an enlarged perspective view of the safety spool assembly taken in the direction of arrow 5 in FIG. 1, with the top panel removed therefrom.
FIG. 6 is a diagrammatic cross sectional view taken along line 6—6 in FIG. 5, showing the recoil spring in greater detail.
Figure 7:
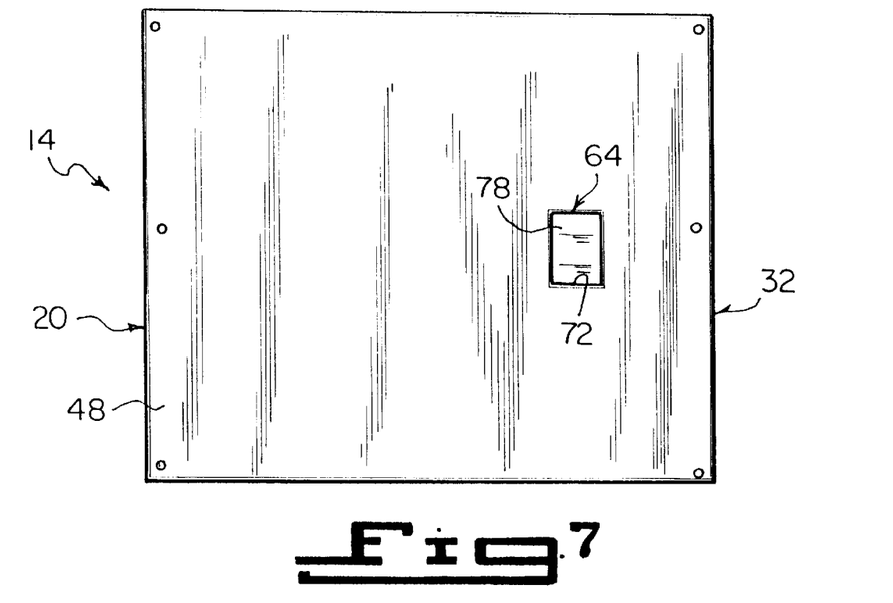
FIG. 7 is a rear elevational view taken in the direction of arrow 7 in FIG. 5.

Each safety spool assembly 20 includes a box shaped housing 32 having a front aperture 34 therethrough. A shaft 36 is horizontally and transversely affixed within the box shaped housing 32. A spool 38 having a pair of flange ends 40, 42 and a barrel 44 is rotatively mounted on the shaft 36 within the box shaped housing 32. A second end of the cable 24 is attached to the barrel 44 of the spool 38 and is wrapped thereabout and extends through the front aperture 34.

The box shaped housing 32 consists of a pair of spaced apart side panels 46. Each side panel 46 has one end of the shaft 36 affixed thereto. A rear panel 48 is attached to the side panels 46. A front panel 50 is attached to the side panels 46. The front panel 50 has the front aperture 34 therethrough. A top panel 52 is attached to the side panels 46. A bottom panel 54 is attached to the side panels 46.

The spring loading and self-rewinding facility 28 is a spiral spring 56, having an outer end 58 affixed to the first flange end 40 of the spool 38 and an inner end 60 is affixed to the shaft 36. When the cable 24 is extended, the spool 38 will rotate to cause the spiral spring 56 to wind up. When the cable 24 is released, the spiral spring 56 will unwind and cause the spool 38 to automatically retract the cable 24. The attaching structure 30 is a loop 62 formed on the distal free end of the cable 24 to connect with the disabled motor vehicle 18.

Figure 9:
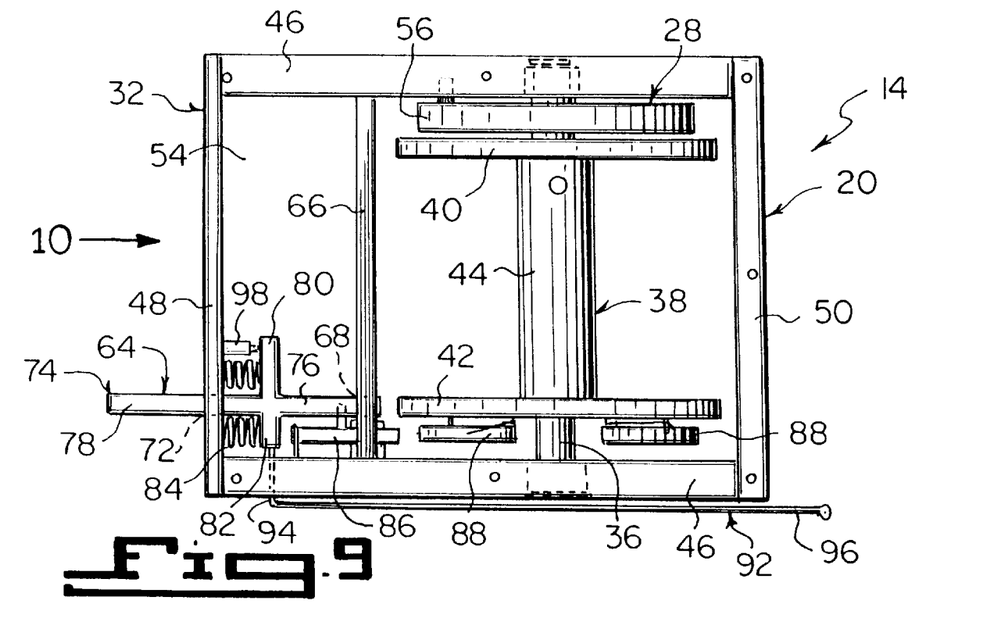
FIG. 9 is a top view taken in the direction of arrow 9 in FIG. 5.
Figure 10:
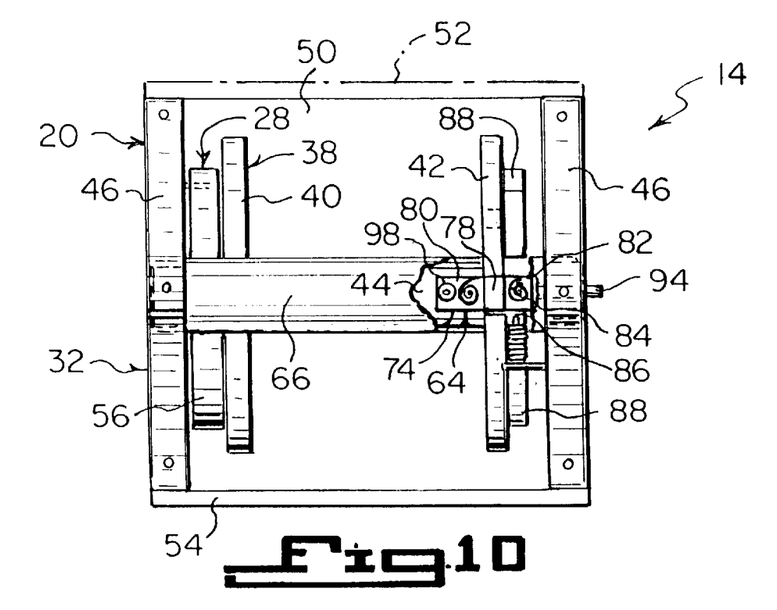
FIG. 10 is a rear view taken in the direction of arrow 10 in FIG. 9, with the rear panel removed therefrom.

The trail safe system 14 can further include a lock mechanism 64 to lock the spool 38 in a stationary position, so that it will not rotate. The lock mechanism 64 includes a support partition 66 mounted within the box shaped housing 32 in parallel relationship between the rear panel 48 and the spool 38 on the shaft 36. The support partition 66 has an opening 68 therethrough. The second flange end 42 of the spool 38 has a plurality of notches 70 radially placed thereabout. The rear panel 48 has a hole 72 therethrough in alignment with the opening 68 in the support partition 66.

A T-shaped locking bar 74 has a pair of legs 76, 78 and a pair of transverse arms 80, 82. The T-shaped locking bar 74 is positioned between the rear panel 48 and the support partition 66. The first leg 76 of the T-shaped locking bar 74 extends through the opening 68 in the support partition 66. The second leg 78 of the T-shaped locking bar 74 extends through the hole 72 in the rear panel 48. A pair of compression springs 84 are between the rear panel 48 and the transverse arms 80, 82 of the T-shaped locking bar 74 forward, so that the first leg 76 will engage with one of the notches 70 in the second flange 42 of the spool 38. A spring biased release lever 86 is pivotally mounted to one side panel 46 to engage with the first leg 76 of the T-shaped locking bar 74, to keep the first leg 76 away from the notches 70 in the second flange 42 of the spool 38. A pair of torsion spring weight levers 88 are mounted onto the second flange end 42 of the spool 38. When the spool 38 rotates centrifugal force will cause one of the torsion spring weight levers 88 to contact the spring biased release lever 86, to disengage from the first leg 76 of the T-shaped locking bar 74 and allow the first leg 76 to move forward and engage with one of the notches 70.

The side panel 46 adjacent the T-shaped locking bar 74 has a horizontal slot 90 therethrough. An L-shaped reset rod 92 has a short leg 94 extending through the horizontal slot 90 and connected to the second transverse arm 82 of the T-shaped locking bar 74. A long leg 96 extends forward out through the tail board 22 of the tow truck 16. The T-shaped locking bar 74 can be reset to be disengaged from the notches 70 in the second flange 42 of the spool 38.

Figure 8:
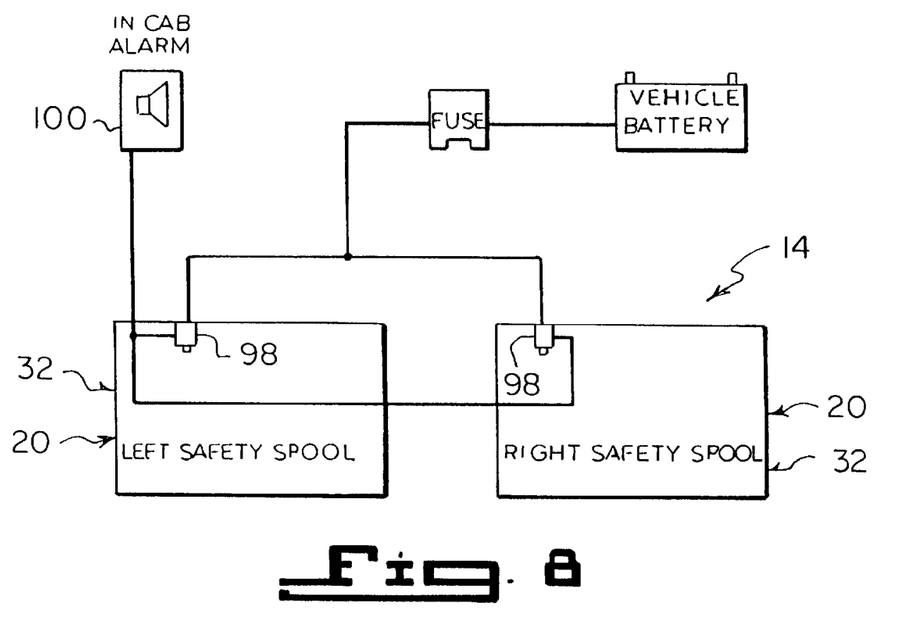
FIG. 8 is an electronic block diagram of the alarm circuit thereof.

An alarm switch 98 can be mounted between the rear panel 48 and the first transverse arm 80 of the T-shaped locking bar 74. When the first leg 76 of the T-shaped locking bar 74 engages with one of the notches 70 in the second flange 42 of the spool 38, the alarm switch 98 will close. An alarm 100 within a cab of the tow truck 16 will activate to warn the driver of the tow truck 16 that the disabled motor vehicle 18 wants to accidentally separate during the towing operation.

Figure 11:
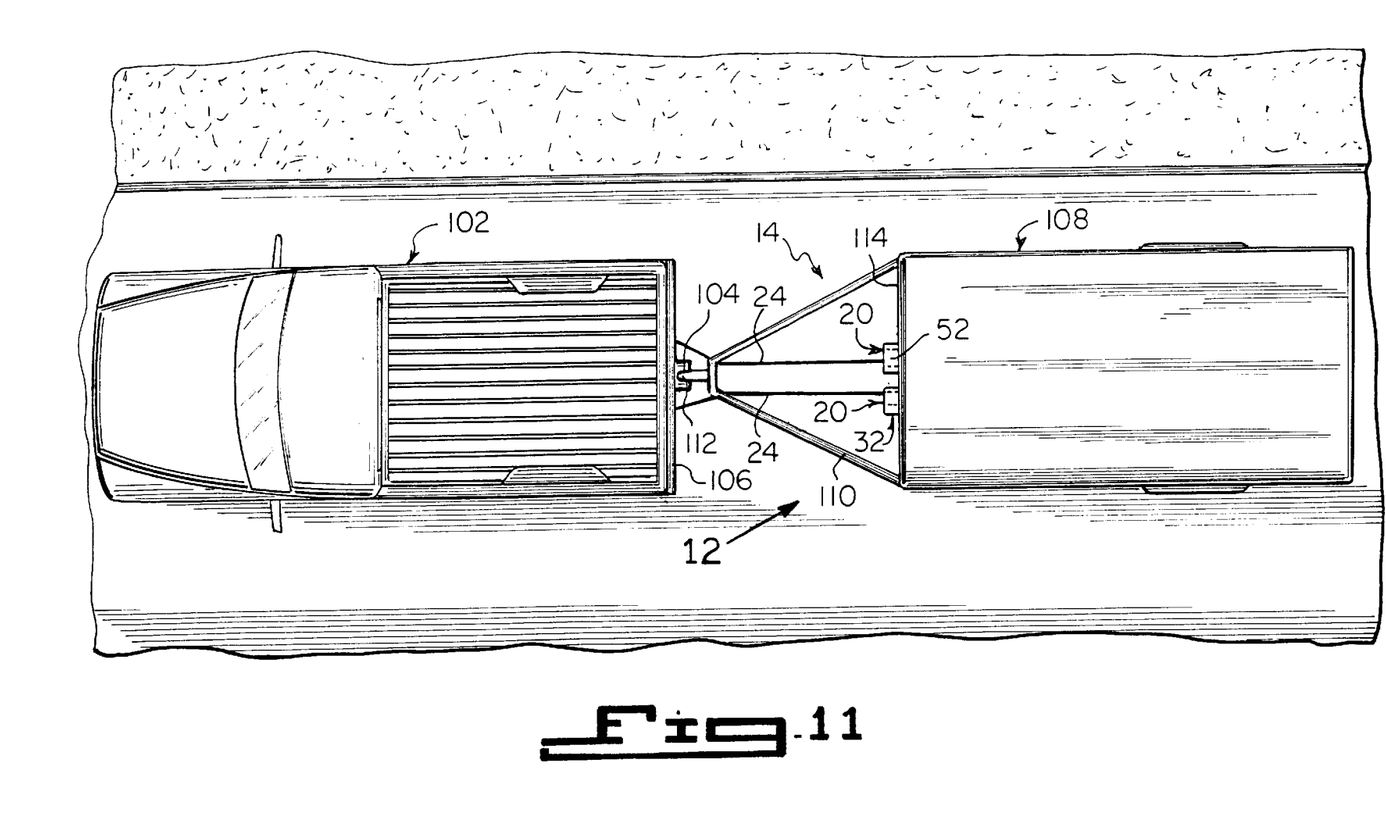
FIG. 11 is a top view showing a pickup truck utilizing the instant invention in towing a trailer.
Figures 12, 12A:
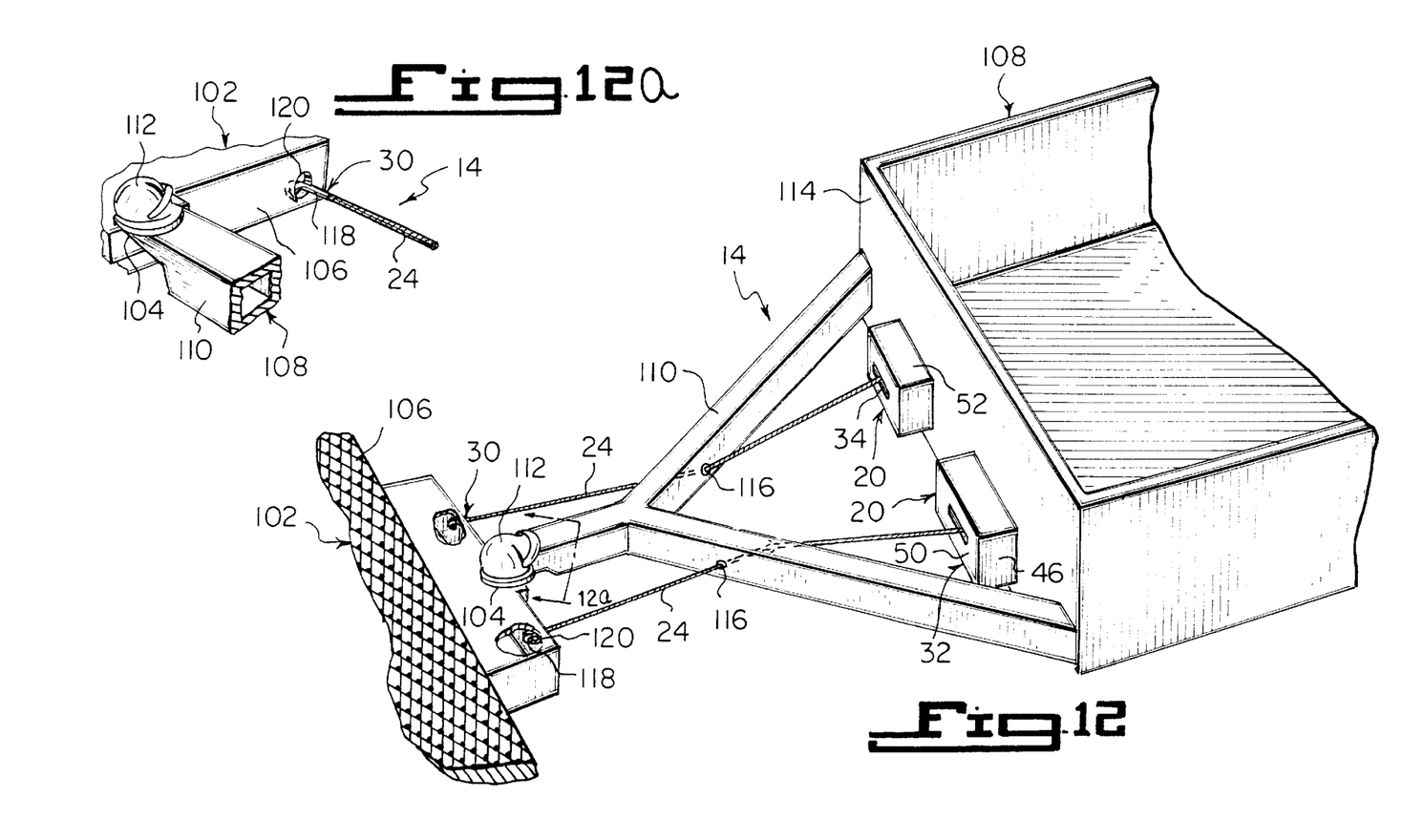
FIG. 12 is a perspective view taken in the direction of arrow 12 in FIG. 11, with parts broken away and in section.
FIG. 12a is an enlarged perspective view taken in the direction of arrow 12a in FIG. 12, with parts broken away and in section.

FIGS. 11, 12 and 12a show a modification, in which the trail safe system 14 extends between a pickup truck 102 having a hitch 104 on a rear bumper 106 and a trailer 108 having a tongue 110 with a coupler 112 connected to the hitch 104. The trail safe system 14 consists of the pair of safety spool assemblies 20. Each safety spool assembly 20 is spaced apart and mounted to a forward end 114 of the trailer 108 at the tongue 110. Each cable 24 also extends from one safety spool assembly 20 and through a protector bushing 116 in the tongue 110. The facility 28 for spring loading and self-rewinding each safety spool assembly 20 is also provided, so that the cable 24 can be automatically retracted as needed. The structure 30 is for attaching a distal free end of each cable 24 to the rear bumper 106 of the pickup truck 102, so as to keep the trailer 108 being towed connected to and behind the pickup truck 102, in case of accidental separation during a towing operation.

Each safety spool assembly 20 with its box shaped housing 32 and the spring loading and self-rewinding facility 28 are identical to the ones described above and shown in FIGS. 1 to 10. The attaching structure 30 is a mini J-hook 118 formed on the distal free end of the cable 24, to connect within an aperture 120 in the rear bumper 106 of the pickup truck 102.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A trail safe system for keeping a disabled vehicle behind a towing vehicle in case of separation during a towing operation, said system comprising:
   a) a pair of safety spool assemblies, each said safety spool assembly spaced apart and for mounting behind a tail board of the towing vehicle, each said safety spool assembly including: a box shaped housing having a front aperture therethrough; a shaft horizontally and transversely affixed within said box shaped housing; and a spool having a pair of flange ends and a barrel rotatively mounted on said shaft within said box shaped housing, with a second end of said cable attached to said barrel of said spool wrapped thereabout and extending through said front aperture, wherein said box shaped housing includes a pair of spaced apart side panels, each said side panel having one end of said shaft affixed thereto; a rear panel attached to said side panels; a front panel attached to said side panels, wherein said front panel has said front aperture therethrough; a top panel attached to said side panels; and a bottom panel attached to said side panels;
   b) a pair of cables, each said cable being adapted to extend from one said safety spool assembly and out through a slot in the tail board of the towing vehicle;
   c) means for spring loading and self-rewinding each said safety spool assembly, so that said cable can be automatically retracted as needed;
   d) means for attaching a distal free end of each said cable to the disabled motor vehicle, so as to keep the disabled motor vehicle being towed connected to and behind the towing vehicle in case of accidental separation during the towing operation; and
   e) a lock mechanism for locking said spool in a stationary position, so that said spool will not rotate, said lock mechanism including:
      i) a support partition mounted within said box shaped housing in parallel relationship between said rear panel and said spool on said shaft, said support partition having an opening therethrough;
      ii) said second flange end of said spool having a plurality of notches radially placed thereabout;
      iii) said rear panel having a hole therethrough in alignment with said opening in said supporting partition;
      iv) a T-shaped locking bar having a pair of legs and a pair of transverse arms said T-shaped locking bar positioned between said rear panel and said support partition in which said first leg of said T-shaped locking bar extends through said opening in said support partition, while said second leg of said T-shaped locking bar extends through said hole in said rear panel;
      v) a pair of compression springs between said rear panel and said transverse arms of said T-shaped locking bar to normal bias said T-shaped locking bar forward, so that said first leg will engage with one of said notches in said second flange of said spool;
      vi) a spring biased release lever pivotally mounted to one of said side panels to engage with said first leg of T-shaped locking bar, to keep said first leg away from said notches in said second flange of said spool; and
      vii) a pair of torsion spring weight levers mounted onto said second flange end of said spool, such that when said spool rotates centrifugal force will cause one of said torsion spring weight levers to contact said spring biased release lever to disengage from said first leg of said T-shaped locking bar and allow said first leg to move forward and engage with one of said notches.

2. A trail safe system as recited in claim 1, wherein said spring loading and self-rewinding means includes a spiral spring having an outer end affixed to said first flange end of said spool and an inner end affixed to said shaft, so that when said cable is extended said spool will rotate to cause said spiral spring to wind up and when said cable is released said spiral spring will unwind and cause said spool to automatically retract said cable.

3. A trail safe system as recited in claim 2, wherein said attaching means is a loop formed on said distal free end of said cable to connect with the disabled motor vehicle.

4. A trail safe system as recited in claim 1, wherein said attaching means is a loop formed on said distal free end of said cable to connect with the disabled motor vehicle.

5. A trail safe system as recited in claim 4, further including:
   a) said side panel adjacent said T-shaped locking bar having a horizontal slot therethrough; and
   b) an L-shaped reset rod having a short leg extending through said horizontal slot and connected to one of said transverse arms of said T-shaped locking bar, while a long leg extends forward out through the tail board of the tow truck, so that said T-shaped locking bar can be reset to be disengaged from said notches in said second flange of said spool.

6. A trail safe system as recited in claim 5, further including an alarm switch mounted between said rear panel and one of said transverse arms of said T-shaped locking bar, so that when said first leg of said T-shaped locking bar engages with one of said notches in said second flange of said spool said alarm switch will close, so that an alarm within a cab of the tow truck will activate to warn the driver of the tow truck that said disabled motor vehicle wants to accidentally separate during the towing operation.

7. A trail safe system as recited in claim 1, further including:
   a) said side panel adjacent said T-shaped locking bar having a horizontal slot therethrough; and
   b) an L-shaped reset rod having a short leg extending through said horizontal slot and connected to one of said transverse arms of said T-shaped locking bar, while a long leg extends forward out through the tail board of the tow truck, so that said T-shaped locking bar can be reset to be disengaged from said notches in said second flange of said spool.

8. A trail safe system as recited in claim 1, further including an alarm switch mounted between said rear panel and one of said transverse arms of said T-shaped locking bar, so that when said first leg of said T-shaped locking bar engages with one of said notches in said second flange of said spool said alarm switch will close, so that an alarm within a cab of the tow truck will activate to warn the driver of the tow truck that said disabled motor vehicle wants to accidentally separate during the towing operation.

* * * * *